United States Patent
Ress

(10) Patent No.: US 9,863,368 B1
(45) Date of Patent: Jan. 9, 2018

(54) AIRCRAFT WITH GAS TURBINE ENGINE HAVING OUTER BYPASS ELEMENTS REMOVED

(71) Applicant: Florida Turbine Technologies, Inc., Jupiter, FL (US)

(72) Inventor: Robert A Ress, Carmel, IN (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/600,822

(22) Filed: May 22, 2017

Related U.S. Application Data

(60) Provisional application No. 62/385,420, filed on Sep. 9, 2016.

(51) Int. Cl.
| | |
|---|---|
| F02K 3/06 | (2006.01) |
| F01D 25/24 | (2006.01) |
| F01D 9/04 | (2006.01) |
| F01D 25/28 | (2006.01) |
| F02C 7/18 | (2006.01) |
| B64D 27/10 | (2006.01) |
| B64C 39/02 | (2006.01) |
| B64D 33/08 | (2006.01) |

(52) U.S. Cl.
CPC .............. F02K 3/06 (2013.01); B64C 39/024 (2013.01); B64D 27/10 (2013.01); B64D 33/08 (2013.01); F01D 9/04 (2013.01); F01D 25/24 (2013.01); F01D 25/28 (2013.01); F02C 7/18 (2013.01); *B64C 2201/048* (2013.01); *F05D 2220/323* (2013.01); *F05D 2250/13* (2013.01); *F05D 2260/20* (2013.01)

(58) Field of Classification Search
CPC . F02K 3/06; F01D 25/28; F01D 25/24; F01D 9/04; B64D 33/08; B64D 27/10; B64D 2033/024; B64C 39/024; B64C 2201/048; B64C 2201/16; F02C 7/18; F05D 2250/13; F05D 2220/323
See application file for complete search history.

(56) References Cited

U.S. PATENT DOCUMENTS

| | | | | |
|---|---|---|---|---|
| 2,940,692 | A * | 6/1960 | Ward ..................... | B64D 27/18 244/15 |
| 3,472,029 | A * | 10/1969 | Colley .................... | F02C 7/277 239/506 |
| 3,972,490 | A * | 8/1976 | Zimmermann ..... | B64C 29/0016 244/12.3 |
| 4,501,393 | A * | 2/1985 | Klees ...................... | F02K 1/625 181/215 |
| 5,987,880 | A * | 11/1999 | Culbertson ............... | F02K 1/70 239/265.37 |
| 6,820,410 | B2 * | 11/2004 | Lair ....................... | B64D 33/04 239/265.11 |

(Continued)

*Primary Examiner* — Woody Lee, Jr.
*Assistant Examiner* — Adam W Brown
(74) *Attorney, Agent, or Firm* — John Ryznic

(57) ABSTRACT

A small aircraft such as a UAV having a gas turbine engine with the outer bypass elements removed from the engine, and where the airframe is modified to form the bypass duct and exhaust nozzle for the fan produced bypass flow of the engine in order to reduce weight, size and cost of the small aircraft. The outer casing and the exhaust nozzle is removed from the engine and optimally integrated into the airframe structure.

8 Claims, 4 Drawing Sheets

(56) References Cited

U.S. PATENT DOCUMENTS

| | | | |
|---|---|---|---|
| 7,510,140 B2* | 3/2009 | Lawson | B64C 15/02 244/12.4 |
| 8,651,426 B2* | 2/2014 | Morvant | B64D 29/02 244/199.1 |
| 2016/0131028 A1* | 5/2016 | Lauer | F02C 6/206 60/805 |

* cited by examiner

AIRCRAFT WITH GAS TURBINE ENGINE HAVING OUTER BYPASS ELEMENTS REMOVED

CROSS-REFERENCE TO RELATED APPLICATIONS

This application claims the benefit to U.S. Provisional Application 62/385,420 filed on Sep. 9, 2016 and entitled AIRCRAFT WITH GAS TURBINE ENGINE HAVING OUTER BYPASS ELEMENTS REMOVED.

GOVERNMENT LICENSE RIGHTS

None.

BACKGROUND OF THE INVENTION

Field of the Invention

The present invention relates generally to an aircraft, and more specifically to a small pilotless aircraft having a gas turbine engine with the airframe forming an outer bypass duct of the engine.

Description of the Related Art Including Information Disclosed Under 37 CFR 1.97 and 1.98

A gas turbine engine for an aircraft includes a fan that compresses air which is subsequently split into a core stream and a bypass stream. The bypass stream flows around the core of the engine and increases the thrust generated by the engine. The bypass flow from the fan 14 passes through an annular passage 11 formed by an outer bypass duct 12 and an inner casing 16. A forward outer casing also includes a section 15 that encompasses the fan stage of the engine. The outer bypass duct 12 is a structural element that is typically formed from a metallic or composite material. A gas turbine engine is typically mounted within an airframe of an aircraft by securing the engine to the airframe at the outer casing of the engine. Because of the thrust developed by the gas turbine engine, the outer casing must be strong enough to secure the engine within the airframe and accommodate the thrust and vehicle maneuver loads. Thus, the outer casing is a robust element of the engine. FIG. 1 shows a prior art gas turbine engine with a fan and an annular passage 11 for the bypass air formed by the outer bypass duct 12 and an inner casing 16 of the engine and an exhaust nozzle 13.

An air vehicle engine bay provides a clearance volume around the propulsion unit. This is typically vented to allow for cooling air to pass through to maintain acceptable vehicle wall temperatures. By eliminating the traditional gas turbine engine outer bypass duct and utilizing the air vehicle engine bay wall to form the bypass stream outer wall, the inner dimensions of the engine bay can be reduced. This translates to a smaller vehicle outer mold line and potentially a smaller overall vehicle size.

BRIEF SUMMARY OF THE INVENTION

A small aircraft such as a UAV with a gas turbine engine in which the outer casing of the engine is removed and replaced by modified airframe structure such that the bypass duct is formed by the remaining casing of the engine and the airframe in order to reduce the overall size, weight and cost of the aircraft.

DETAILED DESCRIPTION OF THE INVENTION

The present invention is an aircraft with a gas turbine engine in which the engine has the outer bypass elements removed and the airframe is modified to form an outer bypass duct of the engine in order to provide for a more integrated engine/airframe installation. The invention offers the potential to reduce the size, cost and weight of the aircraft. The best use for the outer bypass ductless engine is in a pilotless aircraft such as a UAV or a missile where installation size and weight have a large impact on overall vehicle size.

Figure 1:
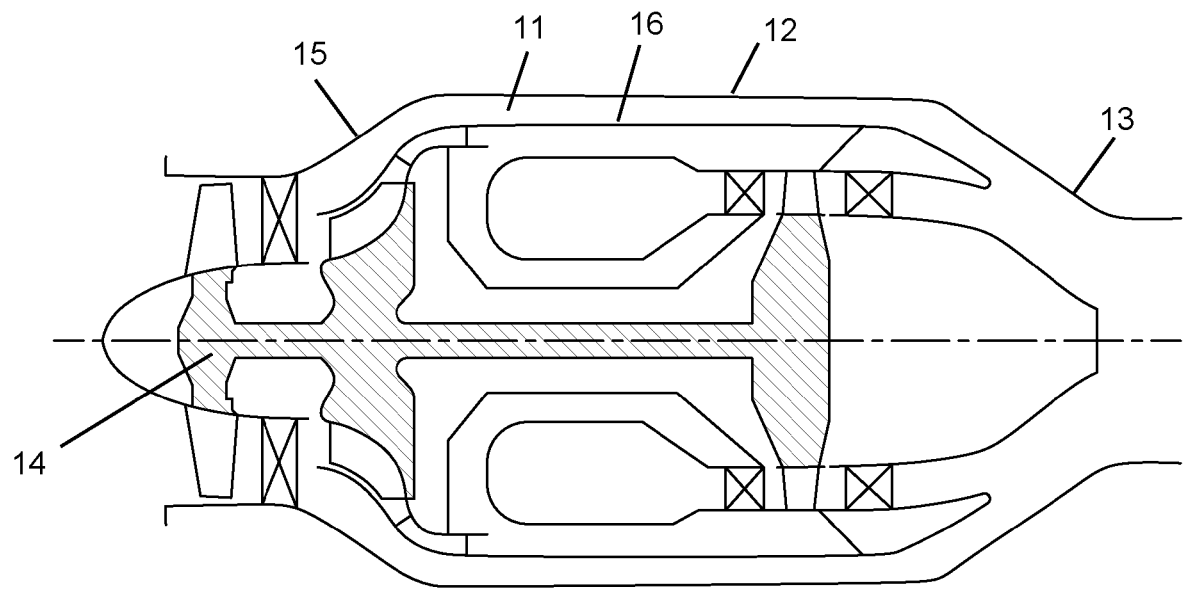
FIG. 1 shows a cross section view of a small gas turbine engine with an outer bypass duct of the prior art.
Figure 2:
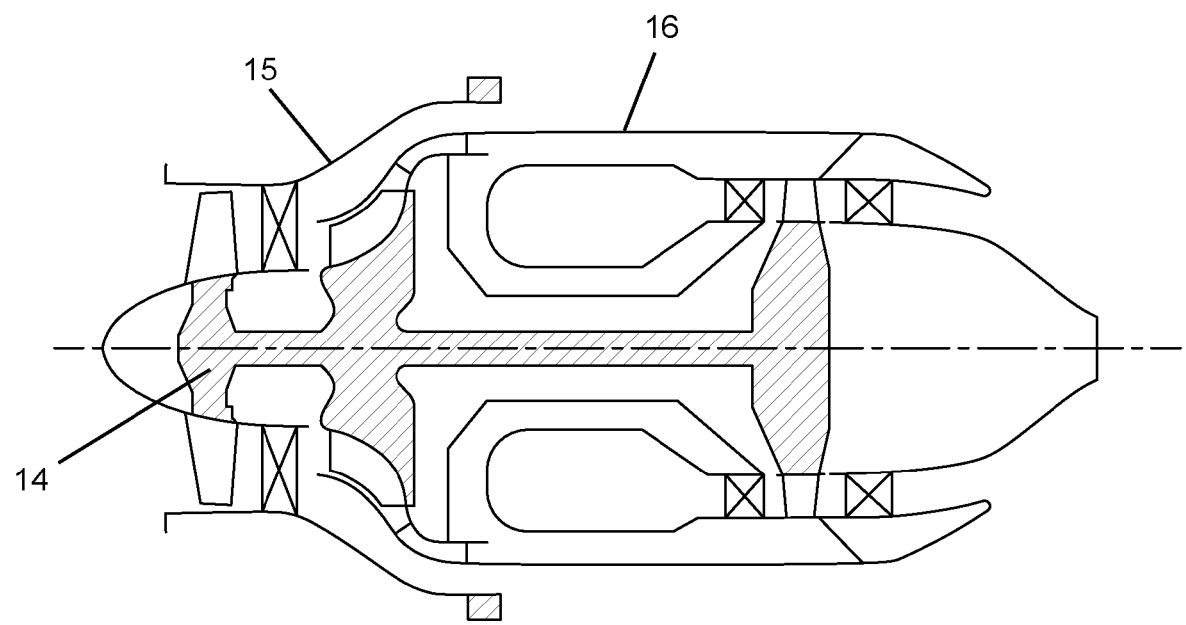
FIG. 2 shows a cross section view of a small gas turbine engine with an outer bypass elements removed from the engine of the present invention.
Figure 3:
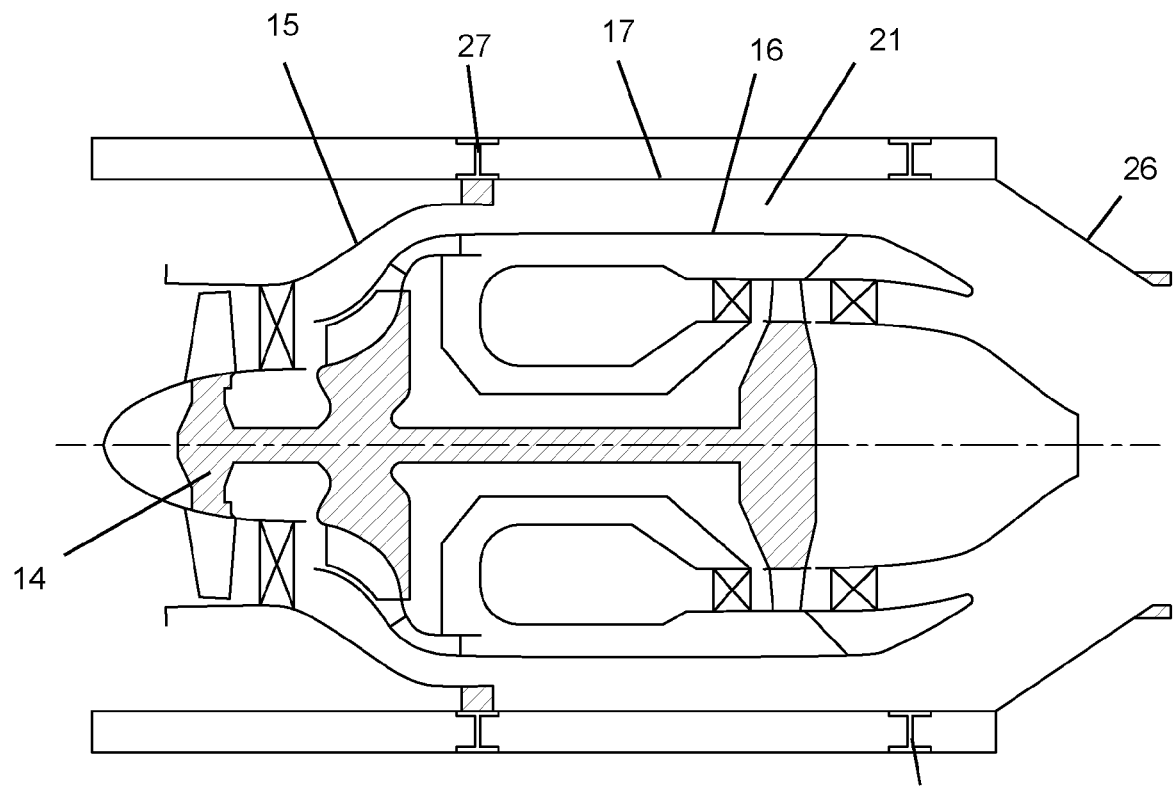
FIG. 3 shows a cross section view of the small gas turbine engine of FIG. 2 mounted within an airframe of a small aircraft of the present invention.

FIG. 2 shows a small gas turbine engine in which the outer bypass duct 12 and exhaust nozzle 13 of the FIG. 1 prior art aero gas turbine engine has been removed. The forward section 15 of the outer duct remains on the modified engine. FIG. 3 shows the engine of FIG. 2 mounted within an airframe of a small aircraft. An inner wall 17 of the vehicle or airframe is shown and forms the outer wall of the bypass duct for the small gas turbine engine mounted within the airframe. An annular passage 21 for the bypass air flow from the fan 14 of the engine is now formed by the vehicle inner wall 17 and the inner casing 16 of the engine. An exhaust nozzle 26 is secured on an aft end of the airframe 17 as seen in FIG. 3. Structural supports 27 are used to stiffen the airframe where the gas turbine engine is secured.

Figure 4:
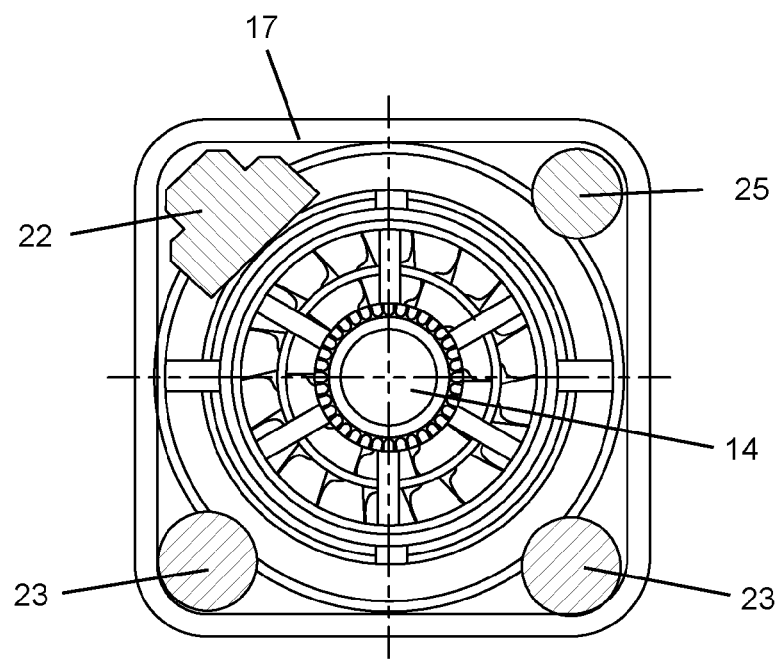
FIG. 4 shows a cross section front view of the airframe and gas turbine engine of FIG. 3 of the present invention.

FIG. 4 shows a front view of the gas turbine engine mounted within the vehicle inner wall 17. In this embodiment, the inner wall 17 is a non-circular vehicle cross section but could also be circular. Start, ignition & lube cartridges 22, a fuel pump 25, and two control surface actuators 23 are also mounted within the non-circular vehicle inner wall 17 as seen in FIG. 4.

An airframe thus can be designed with the inner wall being formed as the outer wall that will form the bypass duct for the fan bypass flow of the small gas turbine engine. The outer bypass duct of the FIG. 1 prior art engine is a metallic or composite structure and thus adds to the overall weight and cost of an engine for a small unmanned aircraft such as a UAV or missile. By eliminating this element of the engine and designing the airframe to form the bypass duct outer wall, a weight and cost savings can be achieved. By eliminating the traditional gas turbine engine outer bypass duct and utilizing the air vehicle engine bay wall to form the bypass stream outer wall, the inner dimensions of the engine bay can be reduced. This translates to a smaller vehicle outer mold line and potentially a smaller overall vehicle size.

Figure 5:
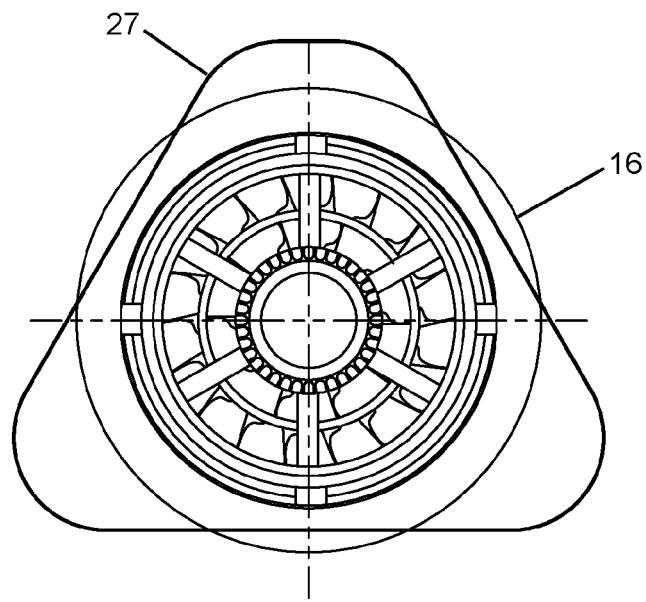
FIG. 5 shows an alternate cross section front view of the airframe and gas turbine engine of FIG. 3 of the present invention.

FIG. 5 shows an alternate cross section front view of the airframe and gas turbine engine of FIG. 3 in which the non-circular vehicle inner wall has a trapezoidal cross section 27. The prior art bypass duct outer diameter is shown superimposed over the trapezoidal cross section shaped duct of the present invention in FIG. 5.

Figure 6:
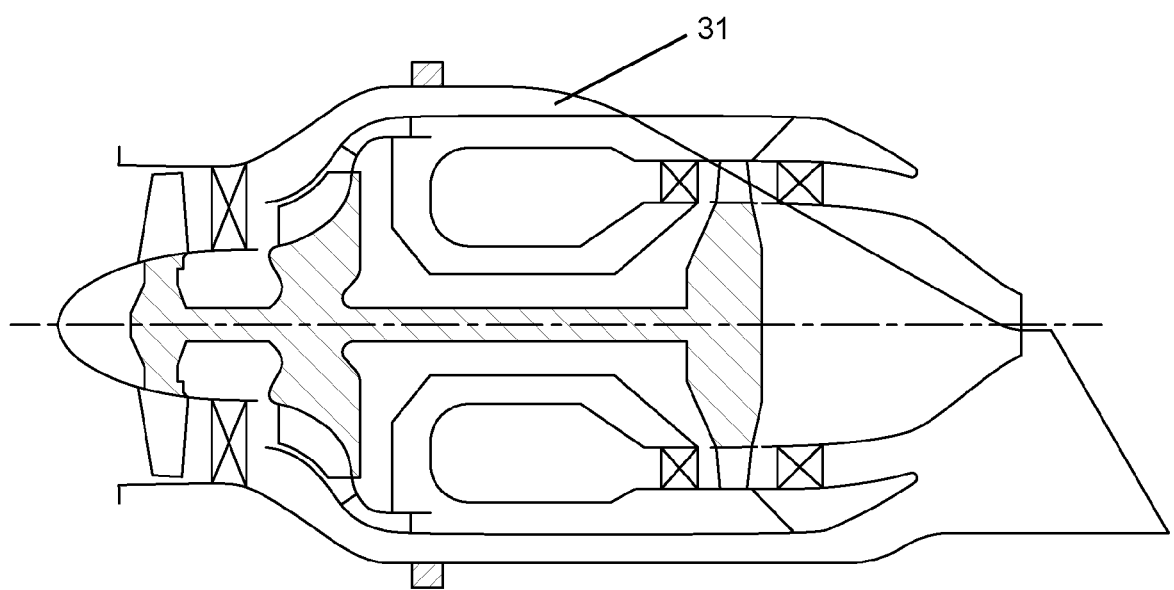
FIG. 6 shows a cross section view of the small gas turbine engine of FIG. 2 mounted within an airframe of a small aircraft of the present invention where the gas turbine engine employs an unmixed exhaust and the bypass nozzle is non-axisymmetric.
Figure 7:
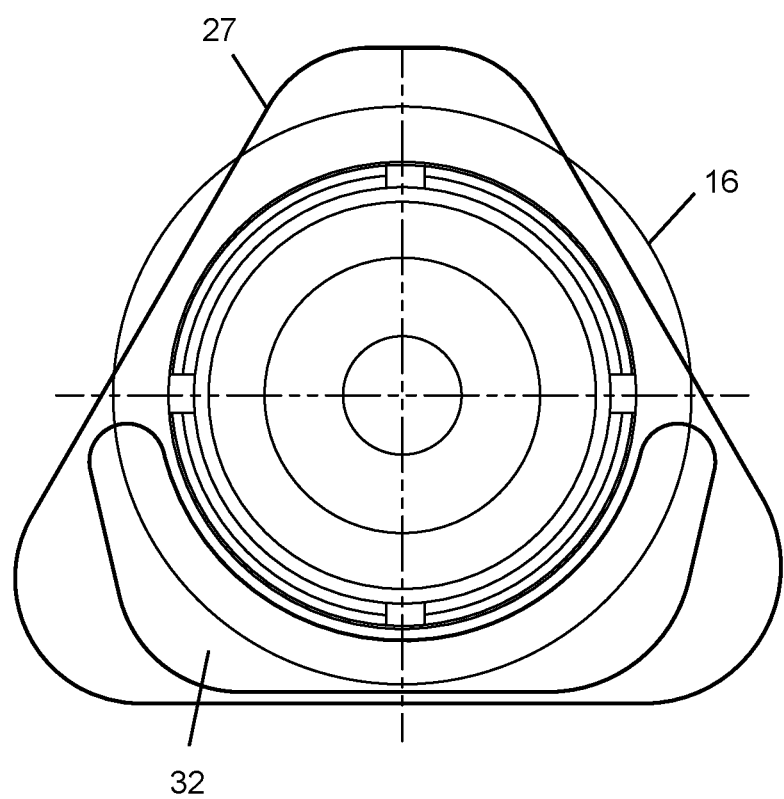
FIG. 7 shows an aft view of the gas turbine engine of FIG. 6 of the present invention.

An airframe configured with a non-circular cross section may employ a non-axisymmetric bypass duct 31 as shown in FIG. 6. Here the bypass stream transitions from annular to non-annular aft of the fan stage. The non-annular duct 31 may consist of a singular element or multiple elements thereby taking advantage of the airframe cross sectional geometry. FIG. 7 shows an aircraft with a trapezoidal cross section 27 employing an unmixed exhaust and an offset bypass stream 32 discharging at the base of the aircraft aft end. The prior art bypass duct outer diameter is shown superimposed over the trapezoidal cross section shaped duct of the present invention in FIG. 7. In this embodiment, the cold bypass stream shields the hot core stream to reduce the IR signature.

I claim the following:

1. A small aircraft comprising:
an airframe;
a small gas turbine engine with a fan to produce a bypass flow;
an outer casing of the small gas turbine engine being removed; and,
an inner wall of the airframe forming a bypass duct for the bypass flow of the fan.

2. The small aircraft of claim 1, and further comprising:
the small aircraft is an unmanned aero vehicle.

3. The small aircraft of claim 1, and further comprising:
an exhaust nozzle is removed from the small gas turbine engine; and,
a new exhaust nozzle is secured to the airframe.

4. The small aircraft of claim 1, and further comprising:
the outer casing of the small gas turbine engine is removed from a location aft of the fan and a compressor of the engine and includes removal of an exhaust nozzle.

5. The small aircraft of claim 1, and further comprising:
the airframe forming the bypass duct is rectangular in cross-sectional shape.

6. The small aircraft of claim 1, and further comprising:
the airframe forming the bypass duct is trapezoidal in cross-sectional shape.

7. The small aircraft of claim 3, and further comprising:
the exhaust is unmixed and the nozzle is non-axisymmetric and is placed such that the cold bypass stream shields the hot core stream to reduce the IR signature.

8. The small aircraft of claim 7, and further comprising:
the bypass duct transitions from annular aft of the fan to a discrete duct or ducts prior to entering the non-axisymmetric nozzle.

* * * * *